United States Patent
Weber

(10) Patent No.: US 6,321,378 B1
(45) Date of Patent: Nov. 20, 2001

(54) AUTOMATED CODE REPLICATION DURING APPLICATION DEVELOPMENT

(75) Inventor: Owen Wayne Weber, Coppell, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/209,342

(22) Filed: Dec. 10, 1998

(51) Int. Cl.$^7$ .................................................. G06F 9/45
(52) U.S. Cl. ......................... 717/5; 717/4; 707/203; 707/3
(58) Field of Search .................... 717/9, 4, 5; 707/2, 707/3, 203

(56) References Cited

U.S. PATENT DOCUMENTS

| | | | |
|---|---|---|---|
| 4,558,413 | * 12/1985 | Schmidt et al. | 707/203 |
| 4,641,274 | * 2/1987 | Swank | 707/531 |
| 4,807,182 | * 2/1989 | Queen | 707/511 |
| 5,440,738 | * 8/1995 | Bowman et al. | 707/6 |
| 5,715,454 | * 2/1998 | Smith | 707/203 |
| 5,768,592 | * 6/1998 | Chang | 717/4 |
| 5,794,253 | * 8/1998 | Norin et al. | 707/203 |
| 5,832,514 | * 11/1998 | Norin et al. | 707/202 |
| 5,832,520 | * 11/1998 | Miller | 707/203 |
| 5,835,911 | * 11/1998 | Nakagawa et al. | 707/203 |
| 5,940,622 | * 8/1999 | Patel | 717/9 |
| 5,953,006 | * 9/1999 | Baker et al. | 345/326 |
| 6,073,214 | * 6/2000 | Fawcett | 711/133 |
| 6,154,876 | * 11/2000 | Haley et al. | 717/4 |
| 6,167,408 | * 12/2000 | Cannon et al. | 707/203 |

OTHER PUBLICATIONS

Title: Eliminating Synchronization Bottlenecks in Object-–Based Programs Using Adaptive Replication: Source: ACM, Author: Rinard et al, 1999.*

Title: Versioning a Full–text Information Retrieval System, Source: ACM, Author: Anick et al, 1992.*

Title: Flexible Update Propogation for Weakly Consistent Replication, ACM, Author: Peterson et al, 10/97.*

* cited by examiner

*Primary Examiner*—Mark R. Powell
*Assistant Examiner*—Chameli C. Das
(74) *Attorney, Agent, or Firm*—Leslie A. VanLeeuwen; Bracewell & Patterson, L.L.P.

(57) ABSTRACT

An application development tool supports a "replicate" mode of operation which, when selected, automatically archives copies of any application source code modules being edited. Where the application source code contains multiple code segments which are symmetrical with respect to size and general content, such as a number of polygon data arrays, in which similar alterations must be implemented globally, the user may make the revision in one code segment and mark the remaining code segments in which the revisions are to be replicated. The application development tool then compares the revised and archived source code modules to identify the pattern of the revisions which were made. Upon detecting a pattern to the revisions, the application development tool automatically replicates the revisions in conformance with the identified pattern within the marked code segments. A solution is thus provided for developers who must alter large amounts of code in a manner which produces an identifiable pattern to the revisions but which cannot be accomplished by simple global find-and-replace processes, saving the developer time by eliminating repetitive tasks which are both time consuming and common sources of errors requiring correction during debug.

20 Claims, 5 Drawing Sheets

AUTOMATED CODE REPLICATION DURING APPLICATION DEVELOPMENT

BACKGROUND OF THE INVENTION

1. Technical Field

The present invention relates in general to application development and in particular to revisions to source code during application development. Still more particularly, the present invention relates to automatically replicating revisions from one source code segment to other segments during application development.

2. Description of the Related Art

Developers utilize various tools for generating highlevel language source code for applications. Tools such as IBM VisualAge Java, Symantec Visual Cafe Pro, or Borland JBuilder, for example, are employed to develop Java applications having an integrated GUI interface within server/client source code. These tools are advanced to the point of automatically generating GUI code from the user-drawn graphical interface. They are severely limited, however, in functionality for generating or changing large amounts of non-GUI code.

Developers frequently need to make similar changes to large sections of code. For instance, a Java application which draws a map of the United States, including each individual state, may be drawn by defining polygons for each state such as the following:

int cox()={187, 251, 250, 178, 187};

int coy()={101, 105, 142, 140, 101};

int cop=cox.length

Polygon co=new Polygon (cox, coy, cop);

This code defines four x-coordinates in the "cox" array, four y-coordinates in the "coy" array, the number of points in the integer "cop," and the Colorado polygon in the "co" polygon. Code similar to this would be replicated for each of the 50 states, resulting in at least 200 lines of code. Furthermore, some polygons would be extremely complex, such as the polygon for Texas, would requires 42 x- and y-coordinates.

If, as is frequently the case, the developer's requirements change after the code for all 50 states has been formulated, the code must be altered to satisfy the new requirements. For the example specified above, if relative coordinates are required in lieu of absolute coordinates, the source code for the Colorado polygon must be changed to:

int cox={(int)(187*x), (int)(251*x), (int)(250*x), (int)(178*x), (int)(187*x)};

int coy()={(int)(101*y), (int)(105*y), (int)(142*y), (int)(140*y), (int)(101*y)};

int cop=cox.length

Polygon co=new Polygon (cox, coy, cop);

The Colorado polygon may now be drawn at a specified point (x, y) in the display, where x and y are defined as floating point variables (which necessitates the "(int)" cast to cast the array elements back to integers).

In replicating the above changes for all fifty states, the developer must change all of the elements of all x-arrays from "NUM" to "(int)(NUM*x)" and all of the elements of all y-arrays from "NUM" to "(int)(NUM*y)". This is a painstaking task, which may be achieved with present tools most efficiently by:

(1) Copying "(int)(" to the clipboard;

(2) Pasting "(int)(" in front of each element in both the x-arrays and the y-arrays;

(3) Copying "*x" to the clipboard;

(4) Pasting "*x" in after each element in every x-array;

(5) Copying "*y" to the clipboard; and (6) Pasting "*y" in after each element in every y-array.

Given that there are up to 42 array elements for each of 50 states, these manual operations must be performed on up to 2,000 elements. Even with the method described above, this requires hours for editing and for debug during compilation.

It would be desirable, therefore, to provide a tool for automatically replicating similar changes in non-GUI code during development.

SUMMARY OF THE INVENTION

It is therefore one object of the present invention to provide an improved method and apparatus for application development.

It is another object of the present invention to provide an improved method and apparatus for making revisions to source code during application development.

It is yet another object of the present invention to provide a method and apparatus for automatically replicating revisions from one source code segment to other, similar source code segments during application development.

The foregoing objects are achieved as is now described. An application development tool supports a "replicate" mode of operation which, when selected, automatically archives copies of any application source code modules being edited. Where the application source code contains multiple code segments which are symmetrical with respect to size and general content, such as a number of polygon data arrays, in which similar alterations must be implemented globally, the user may make the revision in one code segment and mark the remaining code segments in which the revisions are to be replicated. The application development tool then compares the revised and archived source code modules to identify the pattern of the revisions which were made. Upon detecting a pattern to the revisions, the application development tool automatically replicates the revisions in conformance with the identified pattern within the marked code segments. A solution is thus provided for developers who must alter large amounts of code in a manner which produces an identifiable pattern to the revisions but which cannot be accomplished by simple global find-and-replace processes, saving the developer time by eliminating repetitive tasks which are both time consuming and common sources of errors requiring correction during debug.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
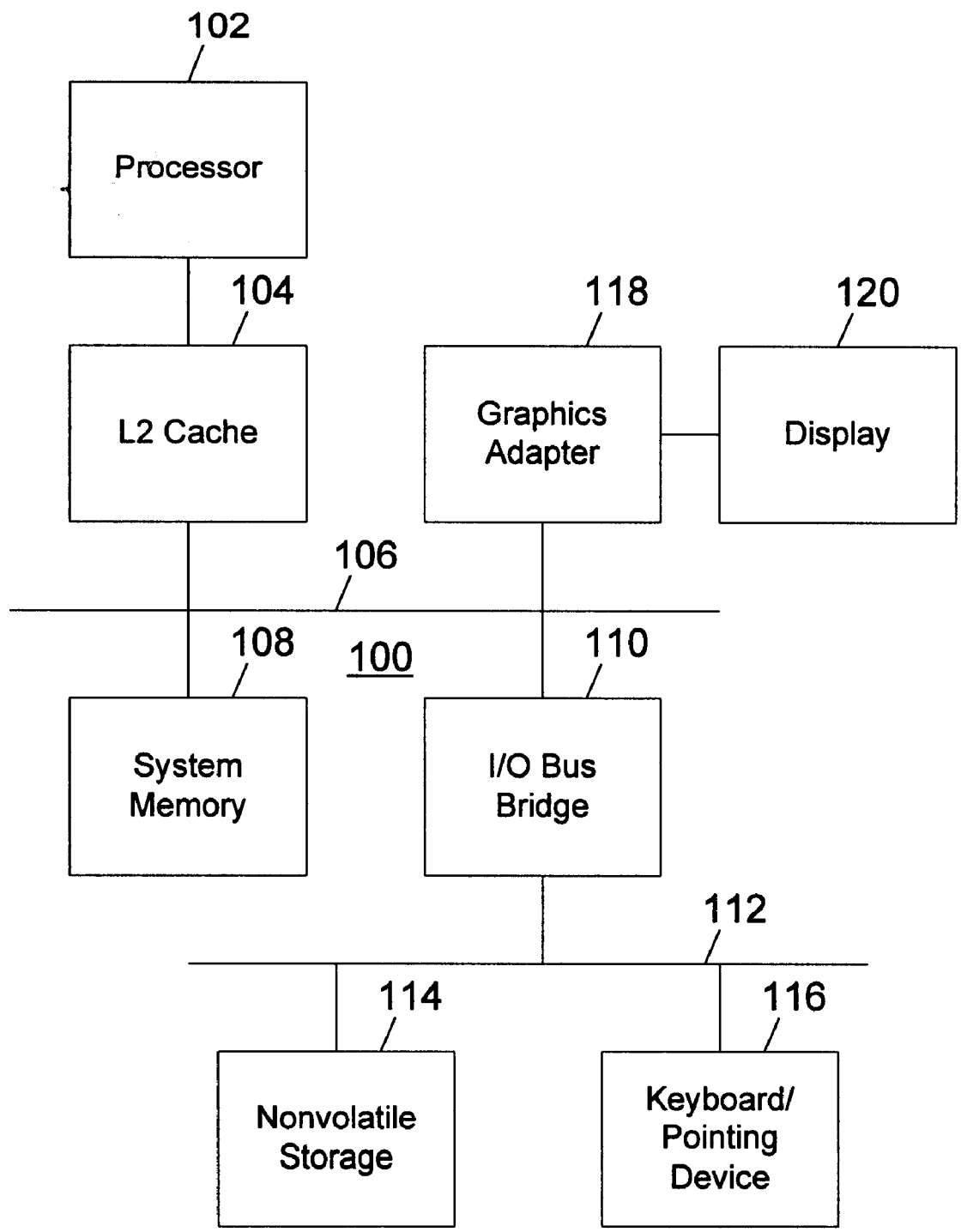
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, one of the Aptiva® available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 116 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. Furthermore, data processing system 100 and the Java examples herein are provided solely as illustrations for the purposes of explanation and are not intended to imply architectural limitations. Those skilled in the art will recognize the numerous programming languages which may be utilized. All such hardware and software variations are believed to be embraced within the spirit and scope of the present invention. In a preferred embodiment, however, data processing system 100 includes an application development tool including the functionality for automatic replication of code revisions which is described in further detail below.

Figures 2A, 2B:
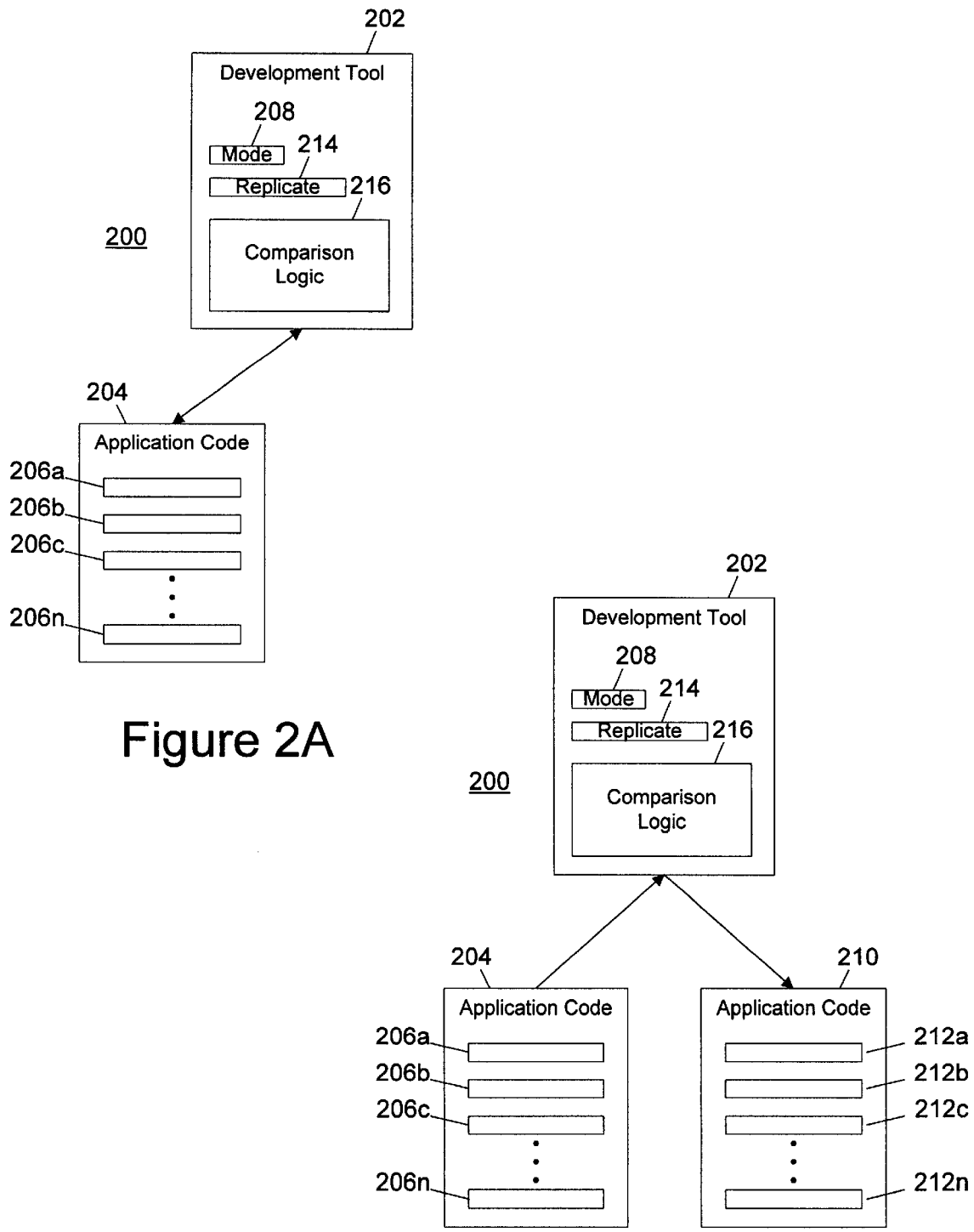
FIGS. 2A–2E are diagrams illustrating a process for automatic code revision replication in accordance with a preferred embodiment of the present invention.

Referring to FIGS. 2A through 2E, diagrams illustrating a process for automatic code revision replication in accordance with a preferred embodiment of the present invention are shown. FIG. 2A is a block diagram of an application development environment 200 in accordance with the present invention. Application development environment 200 includes a development tool 202 which is employed to edit a source code module 204 for an application, with the source code module 204 including a number of similar code segments 206a through 206n. The present invention is best suited for situations in which similar revisions are required for each of code segments 206a–206n.

Development tool 202 includes a mode control 208 for selecting and/or identifying a current mode in which development tool 202 is operating. At least one mode of operation for development tool 202 is a "replicate" mode or includes support for automatic replication. As shown in FIG. 2B, when the replicate mode is selected by a user, development tool 202 creates an archival copy 210 of the source code module 204 being revised, which includes code segments 212a–212n which correspond identically to code segments 206a–206n.

Figure 2C:
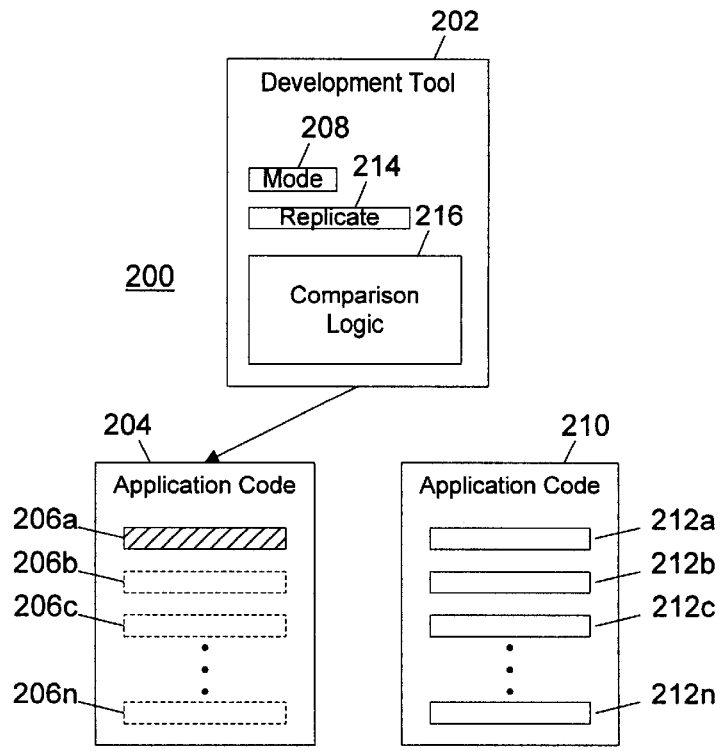
Figure 2D:
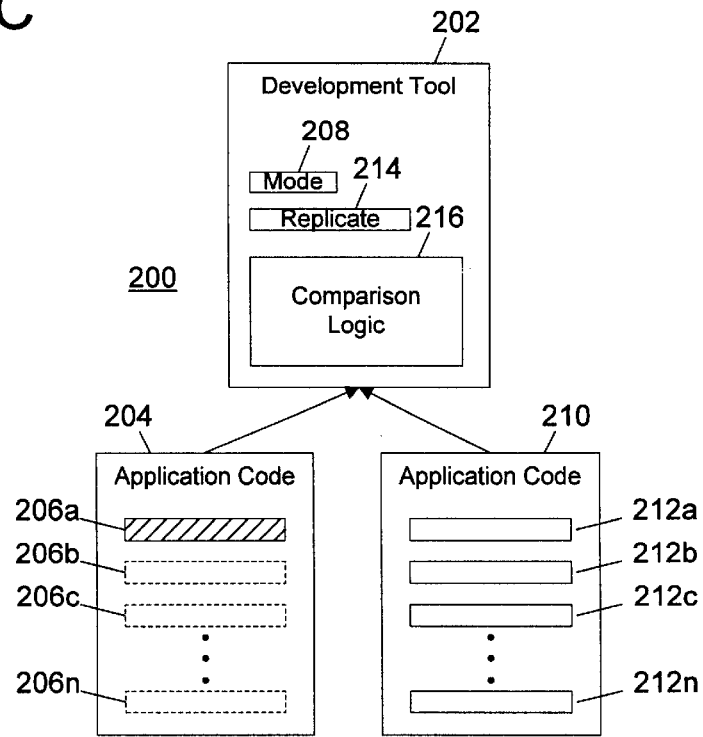

The user then selects one code segment (e.g., code segment 206a) from code segments 206a–206n as illustrated in FIG. 2C and makes the required changes to that selected code segment utilizing development tool 202, then marks the other code segments 206b–206n in which the changes are to be replicated. The user than actuates a "replicate" control 214 within development tool 202, which may be a button, a menu item, or any other known user interface control. Actuation of the replicate function control causes development tool 202 to compare the revised source code segment 206a to the corresponding source code segment 212a utilizing comparison logic 216 as illustrated in FIG. 2D.

Comparison logic 216 within development tool 202 checks for character correspondence within lines of source code, particularly correspondence of delimiter characters defining source code elements such as brackets, parentheses, commas, semi-colons, and blank spaces. In the example of the states described above, with the Colorado polygon definition serving as the source code segment 206a which is revised by the user, comparison logic 216 compares the first line of the revised Colorado polygon definition:

int cox()={(int)(187*x), (int)(251*x), (int)(250*x), (int)(178*x), (int)(187*x)};

to the first line of the original Colorado polygon definition:

int cox()={(int)(187*x), (int)(251*x), (int)(250*x), (int)(178*x), (int)(187*x)};

Comparison logic 216 should detect that all changes in the polygon definition occur between the bracket delimiters and are limited to additions before and after each comma and/or blank-space delimited data element. Comparison logic 216 may thus identify the simple pattern of changes between the revised first line of source code segment 206a (the revised, relative-coordinate Colorado polygon definition) and the corresponding line in the archived version 212a (the original, absolute-coordinate Colorado polygon definition) as involving insertion of "(int)(" before each delimited data element contained within the brackets and insertion of "*x)" after each delimited data element.

Figure 2E:
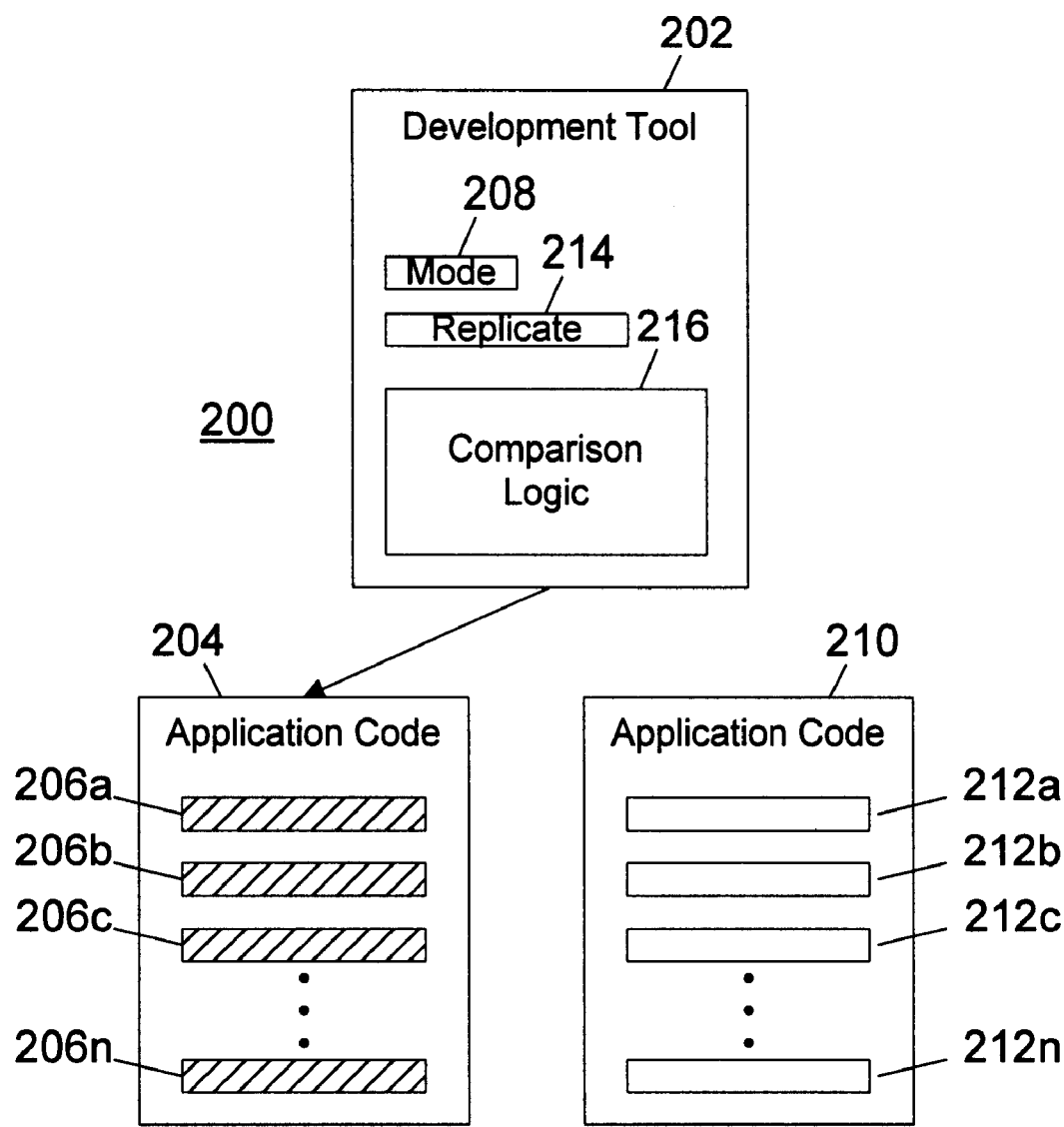

Similarly, by comparing the remaining lines of the revised source code segment 206a with the corresponding lines within archived source code segment 212a, comparison logic 216 may identify that the only other line including changes is the second line, in which "(int)(" was inserted before each delimited data element contained within the brackets and "*x)" was inserted after each delimited data element. Development tool 202 then proceeds to automatically replicate these identified changes within the first two lines of each state polygon definition contained in marked code segments 206b–206n of application code 204, as shown in FIG. 2E.

Because comparison logic 216 relies on pattern detection to identify changes, the present invention works best for—but is by no means limited to—data formatting changes of the type described above. Additionally, the code changes (insertions, deletions, or substitutions) must be follow a pattern for each code segment, and cannot vary from one code segment to the next without some detectable pattern (such as capitalizing the first character in different variable names). As long as a detectable pattern of code changes is made, however, the present invention provides a much more sophisticated revision replication process than, for example, global find-and-replace methods, limited only by the sophistication of the pattern detection algorithm within comparison logic 216.

Figure 3:
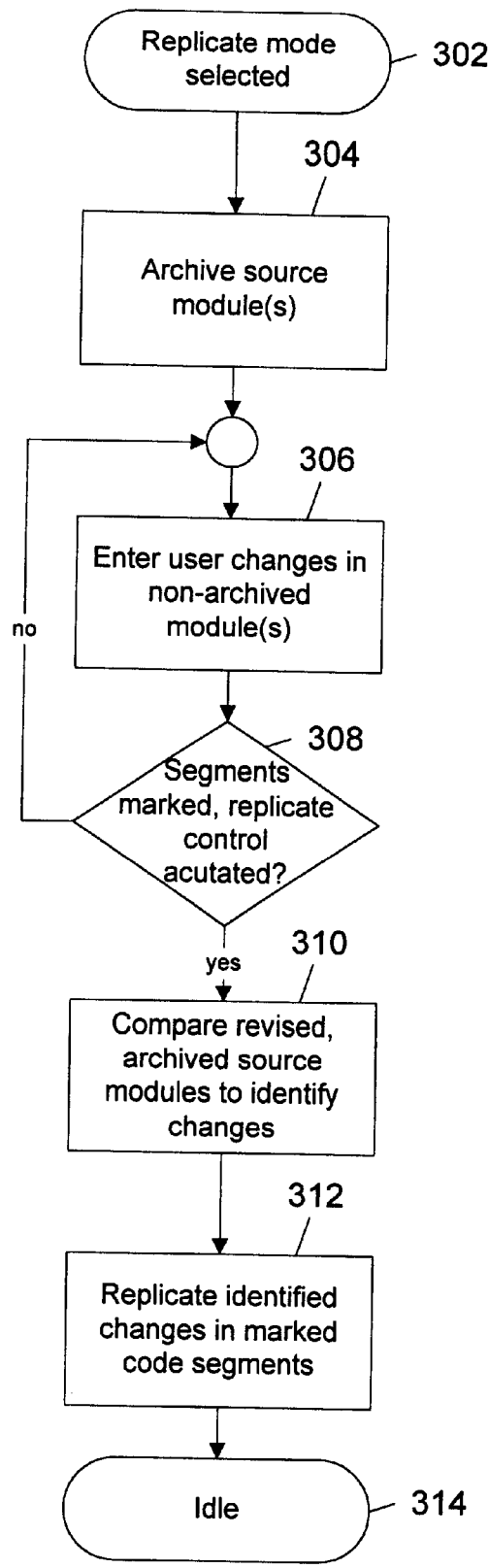
FIG. 3 depicts a high level flowchart for a process for automatic code revision replication in accordance with a preferred embodiment of the present invention.

With reference now to FIG. 3, a high level flowchart for a process for automatic code revision replication in accordance with a preferred embodiment of the present invention is depicted. The process begins at step 302, which depicts selection of a "replicate" mode within an application development tool by a user, then passes to step 304, which illustrates archiving copies of the source module(s) currently being edited by the user with the application development tool. This may include multiple source code modules in which revisions are to be made, with revisions automatically replicated within individual source code modules.

The need for supporting a specific replicate mode may be eliminated if the user is instead required to manually save source code modules and specify revised and unrevised versions for comparison by the application development tool in identifying the changes to be automatically replicated. However, the automatic generation of an archive copy relieves the user of the burden of saving prior versions and specifying which source code modules are to be compared for replication, thus making the automatic replication process more transparent to the user.

The process next passes to step 306, which depicts effecting the user-entered changes to the source code module(s) being revised within the non-archived version of the application code. The process then passes to step 308, which illustrates a determination of whether segment(s) have been marked by the user for revision and the replicate control within the application development tool has been actuated. If not, the process returns to step 306 to continue entering user-specified revisions in the current application code.

Segments to be revised by automatic code change replication should be marked by the user for the development tool. Requiring the development tool to automatically decide whether particular code segments should be revised presents too complex a task for effective implementation. However, any of a number of known methods for marking code segments, either individually or as a group, may be suitably employed.

Once the code segments in which changes are to be automatically replicated have been marked and the replicate control has been actuated by the user, the process proceeds to step 310, which depicts comparing the revised and archived source code modules to identify the changes made by the user. The comparison entails a line-by-line comparison for character correspondence as described earlier. The identified changes will be separately determined for each individual line within the revised segment, and the segments to be revised.

The process next passes to step 312, which illustrates replicating the identified changes in the marked code segments. The application development tool may optionally automatically exit replicate mode at this time. The process finally passes to step 314, which illustrates the process becoming idle until replicate mode is and selected by the user or, if replicate mode is not automatically exited upon completion of the revision replication, until additional code segments are marked and the replicated control is again actuated by the user.

The present invention may be implemented within any application development tool for any programming language, and provides a solution to the developer which must alter large amounts of code in a manner which produces an identifiable pattern to the revisions but which cannot be accomplished by simple global find-and-replace processes. Insertion, deletion, or substitution of data type conversion expressions or operand contents within multiple large data arrays are thus well-suited for the present invention. This may result in a significant time savings for the developer by eliminating repetitive tasks which are both time consuming and common sources of errors requiring correction during debug.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of automatically replicating code revisions, comprising:

comparing a revised code segment to an unrevised code segment to identify differences between the revised and unrevised code segments; and responsive to identifying a change to an element within revised and unrevised code segments, replicating the identified change in each corresponding element within a plurality of marked code segments.

2. The method of claim 1, further comprising:

responsive to a user actuating a revision replication feature for an application development tool, saving a first copy of a code fragment from which the unrevised code segment may be retrieved; and effecting user-specified changes resulting in the revised code segment in a second copy of the code fragment.

3. The method of claim 1, wherein the step of comparing a revised code segment to an unrevised code segment to identify differences between the revised and unrevised code segments further comprises:

comparing each line within the revised code segment to a corresponding line within the unrevised code segment.

4. The method of claim 1, wherein the step of comparing a revised code segment to an unrevised code segment to identify differences between the revised and unrevised code segments further comprises:

comparing each element within the revised code segment to a corresponding element within the unrevised code segment to identify differences between the element and the corresponding element.

5. The method of claim 1, wherein the step of replicating the identified change in each corresponding element within a plurality of marked code segments further comprises:

inserting additional characters before an element.

6. The method of claim 1, wherein the step of replicating the identified change in each corresponding element within a plurality of marked code segments further comprises:

inserting additional characters after an element.

7. The method of claim 1, wherein the step of replicating the identified change in each corresponding element within a plurality of marked code segments further comprises:

substituting characters within an element.

8. The method of claim 1, further comprising:

determining, from identified differences between the revised and unrevised code segments, any changes to each element within revised and unrevised code segments.

9. A system for automatically replicating code revisions, comprising:

a data processing system on which an application development tool is executed, the application development tool:
comparing a line within a revised code segment to a corresponding line within an unrevised code segment;
identifying any character differences between at least one element within the revised code segment and a corresponding element within the unrevised code segment replicating the identified change in each corresponding element within a plurality of marked code segments; and
reproducing the identified character differences within each similar element within a corresponding line of a second unrevised code segment.

10. The system of claim 9, further comprising:
a memory containing a first source code copy including the unrevised code segment and a second code copy including the revised code segment, wherein the application development tool compares the first source code copy to the second source code copy.

11. The system of claim 9, wherein the application development tool compares each delimited element within the revised code segment to a corresponding delimited element within the unrevised code segment.

12. The system of claim 9, wherein the application development tool determines correspondence between the line within the revised code segment and the corresponding line within the unrevised code segment of delimiter characters including brackets, parentheses, commas, semi-colons, and blank spaces.

13. The system of claim 9, wherein the application development tool reproduces the identified character differences by inserting additional characters before an element.

14. The system of claim 9, wherein the application development tool reproduces the identified character differences by inserting additional characters after an element.

15. The system of claim 9, wherein the application development tool reproduces the identified character differences by substituting characters within an element.

16. A computer program product within a computer usable medium for automatically replicating code revisions, comprising:

instructions for comparing a revised code segment to an unrevised code segment to identify differences between the revised and unrevised code segments; and
instructions, responsive to identifying a change to an element within revised and unrevised code segments, for replicating the identified change in each corresponding element within a plurality of marked code segments.

17. The computer program product of claim 16, further comprising:
instructions, responsive to a user actuating a revision replication feature for an application development tool, for saving a first source code copy including the unrevised code segment; and
instructions for effecting user-specified changes resulting in the revised code segment in a second source code copy.

18. The computer program product of claim 16, wherein the instructions for comparing a revised code segment to an unrevised code segment to identify differences between the revised and unrevised code segments further comprise:
instructions for comparing each line within the revised code segment to a corresponding line within the unrevised code segment.

19. The computer program product of claim 16, wherein the instructions for comparing a revised code segment to an unrevised code segment to identify differences between the revised and unrevised code segments further comprise:
instructions for comparing each element within the revised code segment to a corresponding element within the unrevised code segment to identify differences between the element and the corresponding element.

20. The computer program product of claim 16, wherein the instructions for replicating the identified change in each corresponding element within a plurality of marked code segments further comprises:
instructions for inserting additional characters before an element, inserting additional characters after an element, or substituting characters within an element.

* * * * *